United States Patent [19]

James

[11] 4,410,191

[45] Oct. 18, 1983

[54] SELF-ENERGIZING AUTOMATIC LATHE CHUCK

[75] Inventor: Tom P. James, Odessa, Tex.

[73] Assignee: Ken Griffin, Odessa, Tex.

[21] Appl. No.: 235,962

[22] Filed: Feb. 19, 1981

[51] Int. Cl.³ .................... B23B 13/00; B23B 15/00
[52] U.S. Cl. ................................ 279/35; 279/106; 279/1 B
[58] Field of Search ............... 279/28, 29, 35, 1 SG, 279/1 B, 23, 102, 106, 107; 269/287, 237, 254 CS, 77; 254/250, 251, 252, 253, 254, 255; 24/132 R, 133, 114.5, 134

[56] References Cited

U.S. PATENT DOCUMENTS

| 2,012,280 | 8/1935 | Johansen | 279/35 |
| 2,377,953 | 6/1945 | Matton | 269/237 |
| 2,667,356 | 6/1954 | Forward | 279/106 |
| 3,912,287 | 10/1975 | Steinmetz | 279/35 |
| 3,995,869 | 12/1976 | Mazingue | 279/106 |

FOREIGN PATENT DOCUMENTS

| 704417 | 2/1965 | Canada | 24/134 |
| 216791 | 2/1940 | Switzerland | 24/133 |
| 1165066 | 9/1969 | United Kingdom | 24/134 |

Primary Examiner—William R. Briggs
Assistant Examiner—Thomas M. Kline
Attorney, Agent, or Firm—Harvey B. Jacobson

[57] ABSTRACT

A self-energizing lathe chuck is provided with a pair of interiorly mounted clamping shoes which serve to grip a piece of stock directed through an aperture in the chuck so as to retain the stock in a desired working position. The clamping shoes are mounted to a pair of pivot plates which rotate within slots provided in the chuck, and a spring is utilized to bring the clamping shoes into engagement with the stock so as to retain the same in a working position. A movement of the stock through the chuck in one direction results in the clamping shoes being released from engagement with the stock, while any attempted movement of the stock in the reverse axial direction is prevented by the engagement of the clamping shoes with the stock.

3 Claims, 5 Drawing Figures

SELF-ENERGIZING AUTOMATIC LATHE CHUCK

BACKGROUND OF THE INVENTION

1. Field of the Invention

The present invention relates to lathe chucks and more particularly pertains to a new and improved lathe chuck which automatically grips stock positioned therein without any requirement of an operator performing additional functional steps to effect such a lockable positioning of the stock within the chuck.

2. Description of the Prior Art

In view of the continuing trend toward the development of automation, many chucking devices utilized on lathes and similar machines are proving to be inadequate to serve their intended function. Additionally, with advances in technology occurring every day, the nature and shapes of material which must be chucked and machined has become much more diversified. Accordingly, there is an increasing demand and necessity for more versatile chucks which are capable of automatically functioning so as to enable precision machining of parts with a minimum of induced stress and strain.

In this respect, conventional chucks which are normally utilizable on lathes, milling machines, and the like, typically require a positioning of a piece of stock or material to be machined therein, and then a subsequent manual operation must be performed by an operator to effect a fixed locking of the stock within the chuck. Typically, this fixed locking of stock requires that an operator use a chuck key or other similar device to effect a manual inwardly directed movement of clamping jaws into engagement with the stock or such movement may be made by hydraulic or air apparatus. As can be appreciated, this operation substantially hampers automatic machining operations which would otherwise eliminate the need for an operator during a machining operation.

There has been at least one attempt to develop an automatic chuck which would eliminate some of the complexities associated with the manual fixed positioning of a piece of stock within a chuck. In this connection, reference is made to U.S. Pat. No. 2,922,657, issued Jan. 26, 1960, to Garrison et al, wherein there is disclosed a bore edge chuck which automatically chucks a workpiece in a free yet positively located condition so that the work may be precision machined as to its peripheral contour, free of any holding distortion. However, the construction of the Garrison et al device is quite complex and utilizes a cam mechanism which effectively grips a workpiece from an interior hollow portion thereof. In this connection, the Garrison et al device is not utilizable on bar stock in a manner whereby clamping shoes are automatically brought into engagement with an exterior surface of the stock.

Accordingly, it can be appreciated that there exists a continuing need for new and improved lathe chucks which automatically and reliably grip bar stock in a working position and which may be easily and economically manufactured. In this connection, the present invention substantially fulfills this need.

SUMMARY OF THE INVENTION

The present invention, which will be described subsequently in greater detail, provides for a self-energizing automatic lathe chuck that has all of the advantages of the prior art lathe chucks and none of the above-described disadvantages. To attain this, the present invention utilizes a chuck frame member which is screwably attachable to a lathe face plate, and a chuck housing may then be screwably mounted over the frame member. Interiorly mounted within the chuck frame member is a pair of rotatable pivot plates, and a pair of clamping shoes are then pivotally attached to the respective pivot plates. A spring is mounted within an aperture contained within the frame member and serves to bias the pivot plates rearwardly whereby they rotate within slots in a manner which brings the clamping shoes into an abutting relationship. In response to a unidirectional movement of bar stock through an aperture contained within the lathe chuck, the pivot plates rotate against the biasing force of the spring whereby the clamping shoes are brought out of an abutting relationship, thus permitting the bar stock to move outwardly from the lathe chuck into a position for machining or other similar operation. Once the forward movement of the bar stock ceases, the biasing force of the spring once again causes the pivot plates to rotate rearwardly in their retaining slots so as to maintain the clamping shoes in engagement with the bar stock. In the event that an attempt is made to move the stock in an opposite axial direction, an additional rearwardly directed rotative force is provided to the pivot plates whereby the clamping shoes are brought into an increased frictional engagement with the bar stock, thus preventing the rearward movement of the stock through the lathe chuck. As such, any machining operation performed on an end portion of the bar stock results in this increased force being applied to the stock to thus retain the same in a working position.

It is, therefore, an object of the present invention to provide an automatic lathe chuck that has all of the advantages of the prior art lathe chucks and none of the disadvantages.

It is another object of the present invention to provide an automatic lathe chuck that may be easily and economically manufactured.

Still another object of the present invention is to provide an automatic lathe chuck which is simple and reliable in its operation.

Yet another object of the present invention is to provide an automatic lathe chuck which is adaptable for use in a variety of different chucking operations and on machines utilizing the same.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
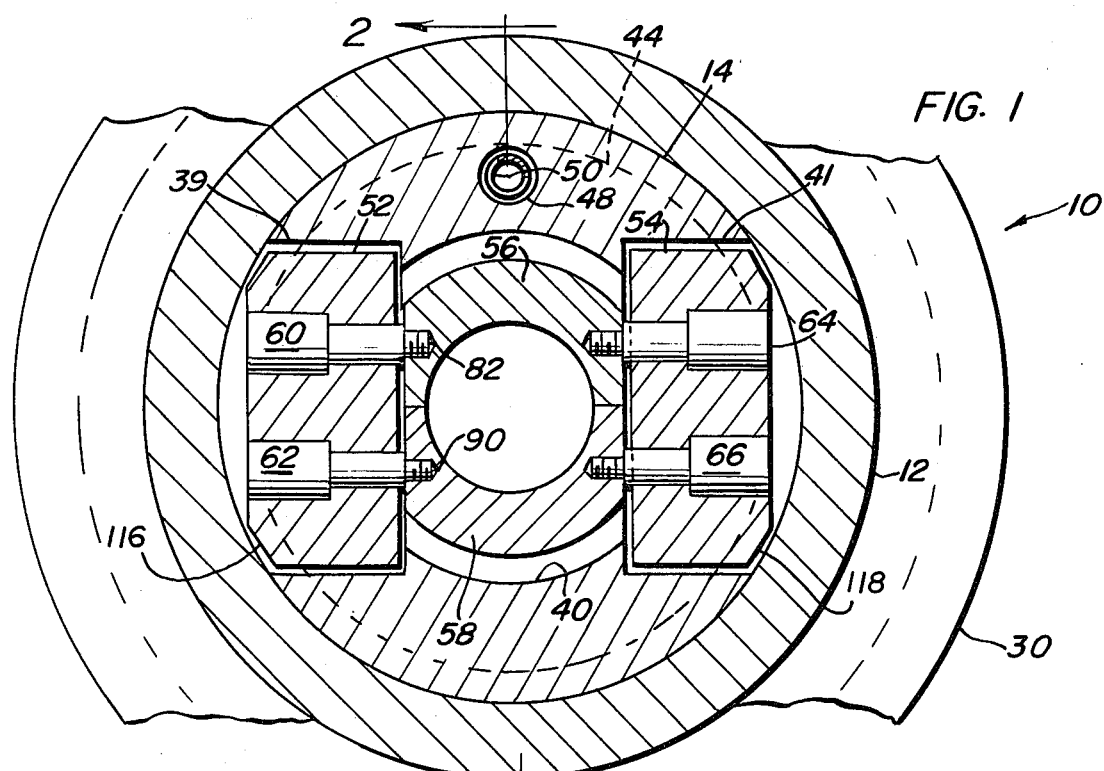
FIG. 1 is a cross-sectional front view of the present invention illustrating the basic components associated therewith.
Figure 2:
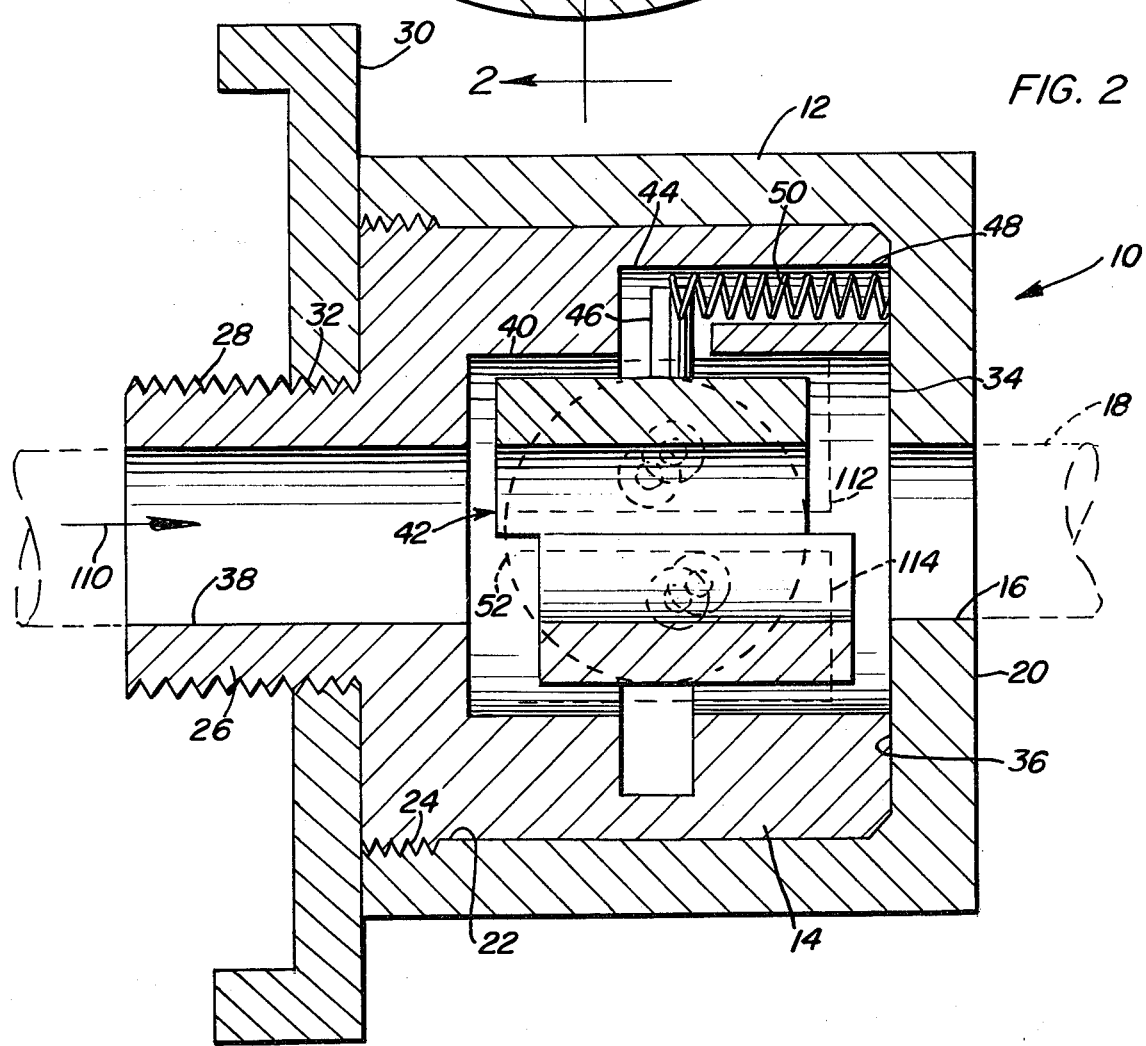
FIG. 2 is a cross-sectional side view of the present invention taken along the line 2—2 of FIG. 1.

With reference now to the drawings and in particular to FIGS. 1 and 2 thereof, a self-energizing automatic lathe chuck embodying the principles and concepts of the present invention and generally designated by the reference numeral 10 will be described in detail. In this connection, it can be seen that the automatic lathe chuck 10 includes a chuck housing 12 which is of a generally cylindrical shape and which is screwably attachable to an inner chuck base or frame member 14. As shown, the chuck housing 12 includes an outlet port or aperture 16 through which a piece of bar stock 18 or similar material may be positioned, such aperture being centrally positioned within an end wall 20 of the housing. On an opposed end of the chuck housing 12, an end wall is not provided so that an interior hollow portion 22 is completely exposed. Screw threads 24 are provided proximate to the open end of the chuck housing 12 so as to facilitate the aforementioned screwable attachment of the housing to the chuck base member 14. In this connection, the chuck base member 14 is provided with mating threads which are engageable with the screw threads 24 contained in the housing 12.

With respect to the construction of the chuck frame member 14, the same is of a generally cylindrical shape and includes a centrally positioned cylindrical extension 26 which is provided with a plurality of screw threads 28 so as to facilitate the screwable mounting of the same to a conventional lathe face plate 30 or other mounting device. In this connection, the lathe face plate 30 is provided with a threaded portion 32 which is engageable with the threads 28 of the cylindrical extension 26, thereby to facilitate the mounting of the chuck frame member 14 and its associated chuck housing 12 directly to the lathe face plate.

As can be further ascertained with reference to the drawings, the chuck frame member 14 is so designed to substantially fill the interior hollow portion 22 of the chuck housing 12 whereby an end portion 34 of the frame member is brought into an abutting relationship with an interior side 36 of the end wall 20 forming a part of the chuck housing 12. Further, the chuck base or frame member 14 is provided with a through extending aperture 38, which is concentrically aligned with the aperture 16 contained within the chuck housing 12, and a pair of axially extending, radially opposed slots 39, 41, the function of which will be subsequently described. In this regard, the through extending aperture 38 includes a first diameter portion as best shown in the cylindrical extension 26 and which is of the same diameter as the aperture 16 positioned within the chuck housing 12. The aperture 38 is then provided with a second greater diameter portion 40 which is designed to facilitate the retention of a jaw cage assembly 42 therein. Further still, a third even greater diameter portion 44 is machined into the interior portion 22 of the chuck frame member 14 so as to provide room for a spring contact member 46, associated with the jaw cage assembly 42, to be contained therein. In this respect, the greater diameter portion 44 is concentrically aligned with the aperture portion 40 and is centrally positioned relative thereto so as to be of a substantially short axial length while affording the aforementioned space required for the spring engaging member 46.

The chuck base or frame member 14 is further provided with an axially extending aperture 48 into which a spring 50 may be positioned in the manner illustrated in both FIGS. 1 and 2. In this regard, it can be seen that one end of the spring 50 is abuttable with the spring engaging member 46, while the other end of the spring abuts directly against the interior wall 34 forming a part of the end wall 20. As such, it can be appreciated that the spring 50 provides a biasing force against the spring engaging member 46 for purposes which will be subsequently described with reference to the further views of the drawings.

Further illustrated in FIGS. 1 and 2 is the positioning of a pair of pivot plates 52, 54 respectively within the aforementioned axially extending slots 39, 41, such pivot plates being freely rotatably movable along axial lengths of the slots and being each respectively attached to a pair of clamping shoes or jaws 56, 58. As illustrated, the pivot plate 52 is provided with first and second bearing set screws 60, 62, while the second pivot plate 54 is provided with third and fourth bearing set screws 64, 66. In effect, the pivot plates 52, 54, the clamping shoes 56, 58, the spring engaging member 46, and the respective bearing set screws 60, 62, 64, 66 form the completed and aforementioned jaw cage assembly 42.

Figure 3:
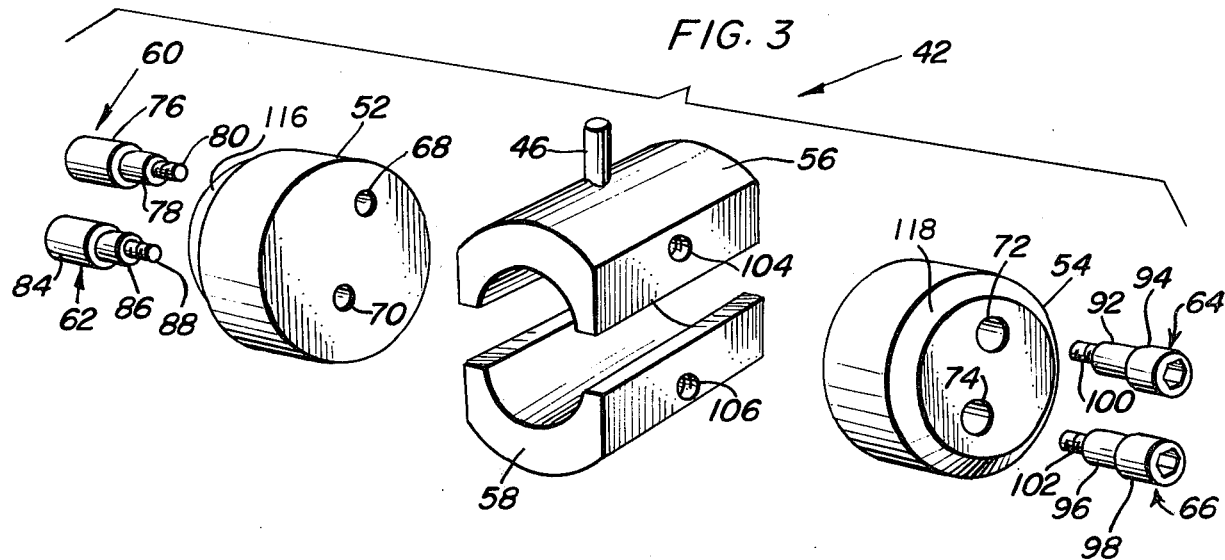
FIG. 3 is an exploded perspective view of the jaw cage arrangement forming a part of the present invention.

Referring now to FIG. 3 of the drawings, a better understanding of the construction and operation of the jaw cage assembly 42 can be ascertained. As clearly illustrated in this figure, the pivot plates 52, 54 are respectively provided with through extending apertures 68, 70 and 72, 74. Viewing FIG. 1 concurrently with FIG. 3, it can be seen that the first bearing set screw 60 includes first and second bearing surfaces 76, 78 and a threaded end portion 80, whereby the bearing surfaces 76, 78 are mateable with interior wall portions of the aperture 68, while the threaded portion 80 of the screw is directly attachable to a threaded aperture 82 contained in the first clamping shoe 56. Similarly, the second bearing set screw 62 is provided with first and second bearing surfaces 84, 86 whch are engageable with interior wall portions of the aperture 70 contained in the pivot plate 52, and further is provided with a threaded portion 88 which is threadably attachable to an aperture 90 contained in the second clamping shoe 58. By the same token, the third and fourth bearing set screws 64, 66 are respectively provided with bearing surfaces 92, 94 and 96, 98 which are respectively engageable with interior wall portions of the apertures 72, 74, and are further provided with threaded end portions 100, 102 which are screwably attachable to threaded apertures 104, 106 respectively contained in the first and second clamping shoes 56, 58.

As such, it can be appreciated that the bearing set screws 60 and 64 serve to rotatably attach the pivot plates 52 and 54 to the first clamping shoe 56, while the bearing set screws 62, 66 serve to rotatably attach the pivot plates 52, 54 to the second clamping shoe 58.

Figure 4:
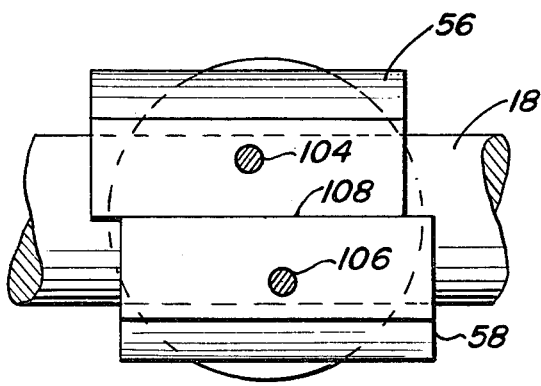
FIG. 4 is a side elevation view illustrating the clamping shoes of the present invention in an abutting relationship about a piece of bar stock.
Figure 5:
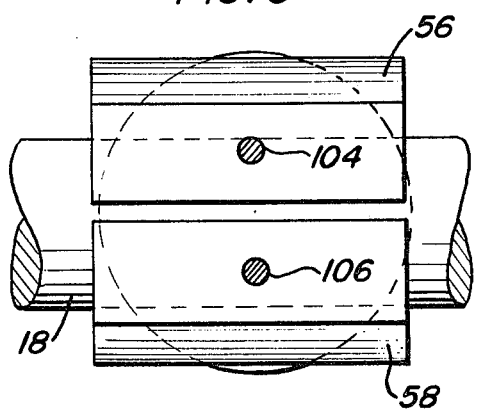
FIG. 5 is a side elevation view of the clamping shoes of the present invention moved out of an abutting relationship in response to a rotation of the pivot plates.

With reference then to FIG. 4 of the drawings, it can be seen that this manner of attachment of the pivot plates 52, 54 to the respective clamping shoes 56, 58 permits a relative movement between the clamping shoes and the associated pivot plates. For example, the clamping shoes 56, 58 may be brought into an abutting relationship whereby the same engage one another along a line or surface 108 when the pivot plates are rotated to a position whereby the respective apertures 68, 70 and 72, 74 on the plates and the coincidental apertures 82, 90 and 104, 106 on the clamping shoes are not horizontally aligned. In other words, as the apertures move out of lateral registry in a plane normal to the centerline of the aperture 38, the distance between the shoes 56, 58 is decreased thus permitting the clamping shoes 56, 58 to move into engagement with a piece of bar stock 18. As illustrated in FIG. 5, when the respective pivot plates 52, 54 are rotated to a position whereby the respective shoe apertures 82, 90 and 104, 106 are laterally registered in a plane normal to the centerline of the aperture 38, the distance therebetween has increased to the point that the clamping shoes 56, 58 are no longer in engagement with one another. In this latter position, it can be appreciated that the bar stock 18 is no longer clamped or frictionally engaged by the respective clamping shoes 56, 58. As can be appreciated, this horizontal movement of the clamping shoes is made possible by the fact that the respective bearing set screws 60, 62, 64, 66 are rotatably mounted within their respective pivot plates 52, 54.

In operation, it can be seen with reference to FIG. 2 of the drawings that the respective clamping shoes 56, 58 would normally be in an abutting relationship due to the fact that the spring 50 provides a rearward biasing force against the spring engaging member 46. In view of the fact that the spring engaging member 46 is fixedly secured to a topmost surface of the clamping shoe 56, the shoe moves rearwardly so as to cause a concurrent rotation of the pivot plates 52, 54 in the same direction along the respective slots 39, 41 until the clamping shoes 56, 58 come into engagement with one another. When it is desired to fixedly position a piece of bar stock 18 within the lathe chuck 10, it is only necessary to insert the stock in the direction of the arrow 110 through the aperture 38, and presumably the stock will be of a greater diameter than the space provided between the clamping shoes 56, 58. As such, the stock will force the clamping shoe 56 forwardly toward the end wall 20 of the chuck housing 12, thereby causing a forward rotation of the pivot plates 52, 54 in the slots 39, 41 and resulting in the clamping shoes 56, 58 then becoming more spaced apart to the positions 112, 114 as shown in broken lines. Once the forward movement of the bar stock 18 ceases, the spring 50 will again cause the pivot plates 52, 54 to rotate rearwardly along the respective bevelled edges 116, 118 which are designed for bearing contact within the respective slots 39, 41. Again then, the clamping shoes 56, 58 move toward an abutting relationship with one another until such time as they clamp about the bar stock 18 so as to effectively lock the same within the lathe chuck 10.

In summary, the above disclosure clearly describes an automatic chuck that will clamp bar stock in the spindle of a lathe so that tools may be applied to turn, bore, thread and part the bar stock as desired. By a continual feeding of the stock in one direction, the stock may be released as desired while effective repositioning of the same may be accomplished for additional turning, boring and threading operations. As required, the base member can be mounted on a face plate, threaded spindle, or cam locked, and the housing itself may be bolted to the base. The base and the housing may be provided with bushings sized to a sliding fit for the stock being worked, and the shoes and the bushings may be changed for different sized stock.

With respect to the above description, it should be realized that the optimum dimensional relationships for the parts of the invention are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An automatic chuck including a base for support from a rotatable lathe mounting portion for rotation therewith, said base having a central work receiving passage extending therethrough and adapted to have an elongated workpiece longitudinally step advanced therethrough in a first direction, a pair of elongated opposing jaws disposed on diametrically opposite sides of said passage, extending longitudinally therealong and including pairs of corresponding sides disposed on opposite sides of the centerline of said passage, first and second connecting means disposed on said opposite sides of said centerline, means pivotally connecting each of said connecting means to each of the corresponding pair of jaw sides for angular displacement relative thereto about parallel axes extending transversely of said passage between said opposite jaw sides, and thrust means operatively connected between said base and one of said jaws yieldingly biasing said one jaw in a second direction opposite to said first direction.

2. The chuck of claim 1 wherein said first and second connecting means comprise connecting discs mounting from said base for rotation relative thereto about at least generally aligned axes substantially coinciding with a diameter of said passage.

3. The combination of claim 2 wherein said jaws are disposed intermediate said connecting discs.

* * * * *